United States Patent
Kajikiya et al.

(10) Patent No.: US 11,894,182 B2
(45) Date of Patent: Feb. 6, 2024

(54) COIL COMPONENT AND WIRELESS POWER TRANSMISSION DEVICE HAVING THE SAME

(71) Applicant: TDK Corporation, Tokyo (JP)

(72) Inventors: Shoma Kajikiya, Tokyo (JP); Noritaka Chiyo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/748,556

(22) Filed: May 19, 2022

(65) Prior Publication Data

US 2022/0375682 A1   Nov. 24, 2022

(30) Foreign Application Priority Data

May 24, 2021   (JP) ................. 2021-086648

(51) Int. Cl.
| | |
|---|---|
| *H01F 5/04* | (2006.01) |
| *H01F 27/28* | (2006.01) |
| *H01F 38/14* | (2006.01) |
| *H02J 50/10* | (2016.01) |
| *H02J 50/80* | (2016.01) |

(52) U.S. Cl.
CPC .............. *H01F 38/14* (2013.01); *H01F 5/04* (2013.01); *H01F 27/28* (2013.01); *H02J 50/10* (2016.02); *H02J 50/80* (2016.02)

(58) Field of Classification Search
CPC .................... H01F 5/04; H01F 17/0006; H01F 2017/0086; H01F 27/28; H01F 27/2804; H01F 38/14; H01F 2038/143; H02J 50/10; H02J 50/12; H02J 50/80; H04B 5/0031; H04B 5/0037; H04B 5/0075; H04B 5/0081; H04B 5/0087
See application file for complete search history.

(56) References Cited

U.S. PATENT DOCUMENTS

| | | | |
|---|---|---|---|
| 2014/0168019 A1* | 6/2014 | Hirobe ................ | H01Q 1/2208 343/788 |
| 2015/0126112 A1 | 5/2015 | Park et al. | |
| 2016/0345125 A1* | 11/2016 | Kim .................. | G06Q 20/4014 |
| 2017/0063128 A1* | 3/2017 | Van Bosch ......... | H01F 27/2871 |
| 2018/0174746 A1* | 6/2018 | Ryu ..................... | H04B 5/0037 |
| 2018/0198209 A1* | 7/2018 | Kang ..................... | H01Q 1/38 |
| 2018/0205268 A1* | 7/2018 | Park ...................... | H02J 50/80 |
| 2019/0156994 A1* | 5/2019 | Cox .................. | G06K 19/0712 |
| 2020/0380332 A1* | 12/2020 | Matsushima ........ | H01Q 1/2283 |
| 2021/0044019 A1* | 2/2021 | Sohn ...................... | H01Q 1/38 |

FOREIGN PATENT DOCUMENTS

| | | |
|---|---|---|
| JP | 2013-021902 A | 1/2013 |
| JP | 2015-092569 A | 5/2015 |

* cited by examiner

*Primary Examiner* — Levi Gannon
(74) *Attorney, Agent, or Firm* — Rimon P.C.

(57) ABSTRACT

Disclosed herein is a coil component that includes a first coil, and a second coil disposed so as to surround the first coil. The first coil includes a first section extending in a first direction, a second section extending in a second direction orthogonal to the first direction, and a third section positioned between the first and second sections. Gaps between the first, second, and third sections of the first coil and the second coil as viewed in a coil axis direction have a first width, a second width, and a third width, respectively. The second width is larger than the first width and smaller than the third width.

8 Claims, 6 Drawing Sheets

COIL COMPONENT AND WIRELESS POWER TRANSMISSION DEVICE HAVING THE SAME

CROSS-REFERENCE TO RELATED APPLICATION

This application claims the benefit of Japanese Patent Application No. 2021-086648, filed on May 24, 2021, the entire disclosure of which is incorporated by reference herein.

BACKGROUND

Field

The present disclosure relates to a coil component and a wireless power transmission device having the coil component.

Description of Related Art

The coil component described in JP 2015-092569A has a structure in which a coil pattern for near-field communication (NFC) is disposed so as to surround a coil pattern for wireless power transmission.

However, in the coil component described in JP 2015-92569A, the coil pattern for wireless power transmission has an elliptical shape, and the coil pattern for NFC has a substantially rectangular shape, which makes it difficult to satisfy both the power transmission characteristics and the communication characteristics.

SUMMARY

It is therefore an object of the present disclosure to provide a coil component capable of satisfying both the different characteristics required respectively for two coils having different functions.

A coil component according to the present disclosure includes a first coil and a second coil disposed so as to surround the first coil. The first coil includes a first section extending in a first direction, a second section extending in a second direction orthogonal to the first direction, and a third section positioned between the first and second sections. Gaps between the first, second, and third sections of the first coil and the second coil as viewed in the coil axis direction have a first width, a second width, and a third width, respectively, wherein the second width is larger than the first width and smaller than the third width.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
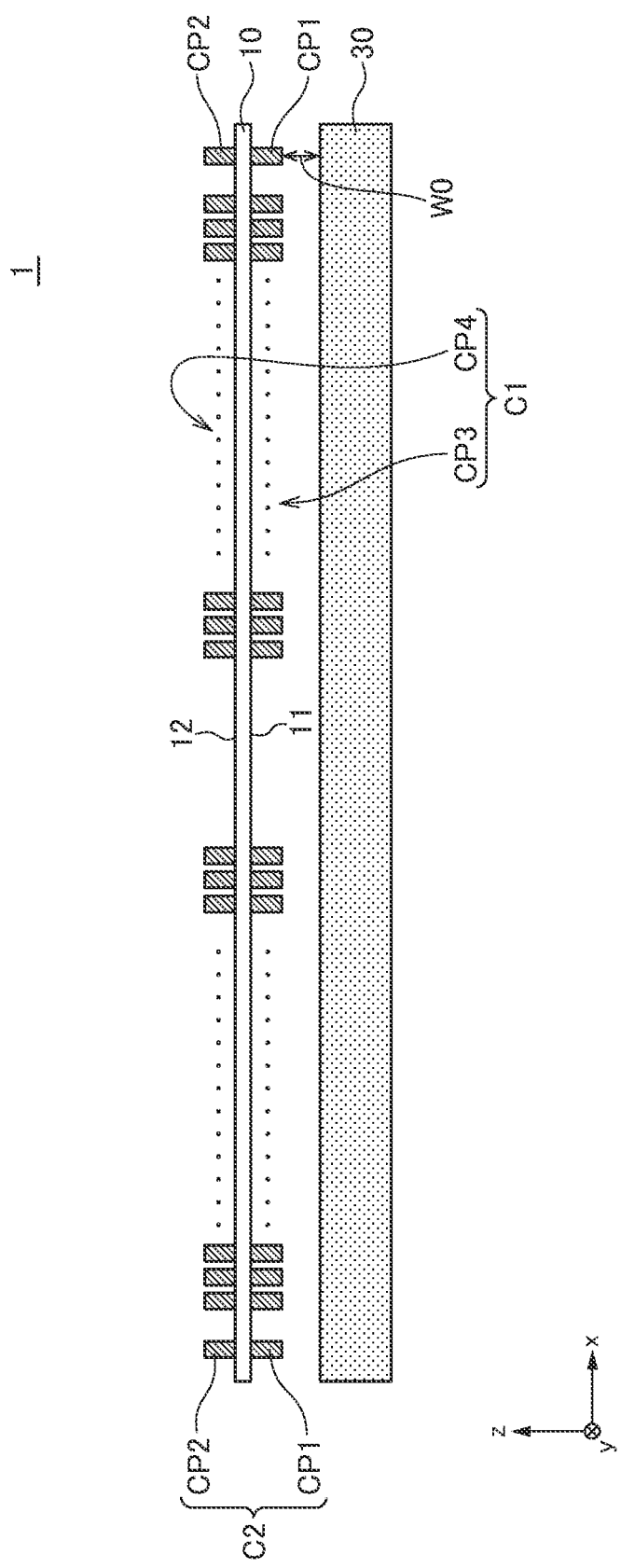
FIG. 1 is a schematic cross-sectional view for explaining the structure of a coil component 1 according to an embodiment of the present disclosure.

FIG. 1 is a schematic cross-sectional view for explaining the structure of a coil component 1 according to an embodiment of the present disclosure.

As illustrated in FIG. 1, the coil component 1 according to the embodiment includes a substrate 10 made of, for example, a PET film, a first coil pattern CP1 and a third coil pattern CP3 which are provided on one surface 11 of the substrate 10, a second coil pattern CP2 and a fourth coil pattern CP4 which are provided on the other surface 12 of the substrate 10, and a magnetic sheet 30. The third and fourth coil patterns CP3 and CP4 constitute a power transmission coil C1 for wireless power transmission, which is an example of a first coil. The first and second coil patterns CP1 and CP2 constitute an antenna coil C2 for NFC, which is an example of a second coil. The coil axis direction of each of the power transmission coil C1 and antenna coil C2 is the z-direction, and the substrate 10 and magnetic sheet 30 are disposed so as to overlap each other in the z-direction. Although the surface 11 of the substrate 10 faces the magnetic sheet 30 in the example illustrated in FIG. 1, the substrate 10 may be set such that the surface 12 of the substrate 10 faces the magnetic sheet 30.

Figure 2:
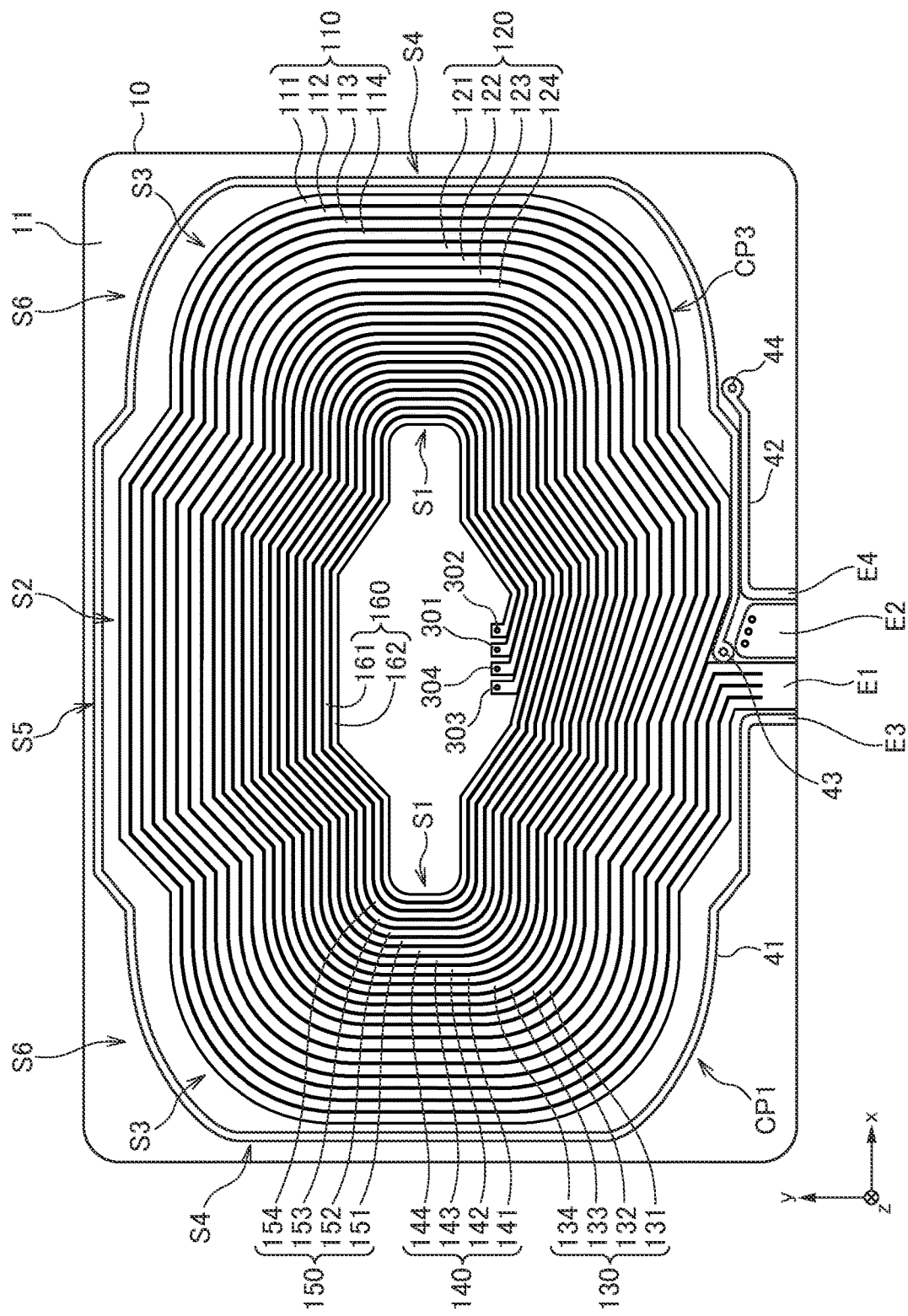
FIG. 2 is a schematic plan view illustrating the shape of a conductor pattern formed on the surface 11 of the substrate 10.

FIG. 2 is a schematic plan view illustrating the shape of a conductor pattern formed on the surface 11 of the substrate 10.

As illustrated in FIG. 2, there are formed, on the surface 11 of the substrate 10, the first coil pattern CP1, the third coil pattern CP3, and first to fourth terminal electrodes E1 to E4. The first and second terminal electrodes E1 and E2 are disposed so as to be sandwiched between the third and fourth terminal electrodes E3 and E4, so that current flowing in the power transmission coil C1 has substantially the same influence on the third and fourth terminal electrodes E3 and E4, which reduces the influence of noise from the power transmission coil C1 as compared to when the first to fourth terminal electrodes E1 to E4 are arranged in this order. This also facilitates connection to a device in which the coil component 1 is to be incorporated.

The third coil pattern CP3 has a six-turn configuration constituted of turns 110, 120, 130, 140, 150, and 160, and the turns 110 and 160 are positioned at the outer and inner peripheries, respectively. The turns 110, 120, 130, 140, and 150 are each radially divided into four by three spiral slits. The turn 160 is radially divided into two by a single spiral slit. Thus, the turn 110 is divided into four lines 111 to 114, the turn 120 is divided into four lines 121 to 124, the turn 130 is divided into four lines 131 to 134, the turn 140 is divided into four lines 141 to 144, the turn 150 is divided into four lines 151 to 154, and the turn 160 is divided into two lines 161 and 162.

The lines 111, 121, 131, 141, 151, and 161 are continuous lines spirally wound in six turns and are each positioned at the outermost periphery in its corresponding turn. The lines 112, 122, 132, 142, 152, and 162 are continuous lines spirally wound in six turns and are each the second line counted from the outermost peripheral line in its corresponding turn. The lines 113, 123, 133, 143, and 153 are continuous lines spirally wound in five turns and are each the second line counted from the innermost peripheral line in its corresponding turn. The lines 114, 124, 134, 144, and 154 are continuous lines spirally wound in five turns and are each positioned at the innermost periphery in its corresponding turn.

The outer peripheral ends of the lines 111 to 114 are connected in common to the first terminal electrode E1. The inner peripheral ends of the lines 161, 162, 153, and 154 are connected respectively to through hole conductors 301 to 304 penetrating the substrate 10.

The third coil pattern CP3 includes a first section S1 extending in the y-direction (first direction), a second section S2 extending in the x-direction (second direction), and a third section S3 positioned between the first and second sections S1 and S2. When the position where the terminal electrodes E1 to E4 are disposed is assumed to be the 6 o'clock position, the first section S1 is positioned at the 3 o'clock and 9 o'clock positions, and the second section S2 is positioned at the 12 o'clock position.

The first coil pattern CP1 includes a conductor pattern 41 disposed outside the third coil pattern CP3 so as to surround the third coil pattern CP3 and a conductor pattern 42 disposed outside the third coil pattern CP3 separately from the conductor pattern 41. The conductor pattern 41 is a continuous line wound in about one turn, and the third coil pattern CP3 is disposed in the opening area (inner diameter area) of the conductor pattern 41. One end of the conductor pattern 41 is connected to the third terminal electrode E3, and the other end thereof is connected to a through hole conductor 43 penetrating the substrate 10. One end of the conductor pattern 42 is connected to the fourth terminal electrode E4, and the other end thereof is connected to a through hole conductor 44 penetrating the substrate 10.

The first coil pattern CP1 includes a fourth section S4 extending in the y-direction, a fifth section S5 extending in the x-direction, and a sixth section S6 positioned between the fourth and fifth sections S4 and S5. When the position where the terminal electrodes E1 to E4 are disposed is assumed to be the 6 o'clock position, the fourth section S4 is positioned at the 3 o'clock and 9 o'clock positions, and the fifth section S5 is positioned at the 12 o'clock position.

Figure 3:
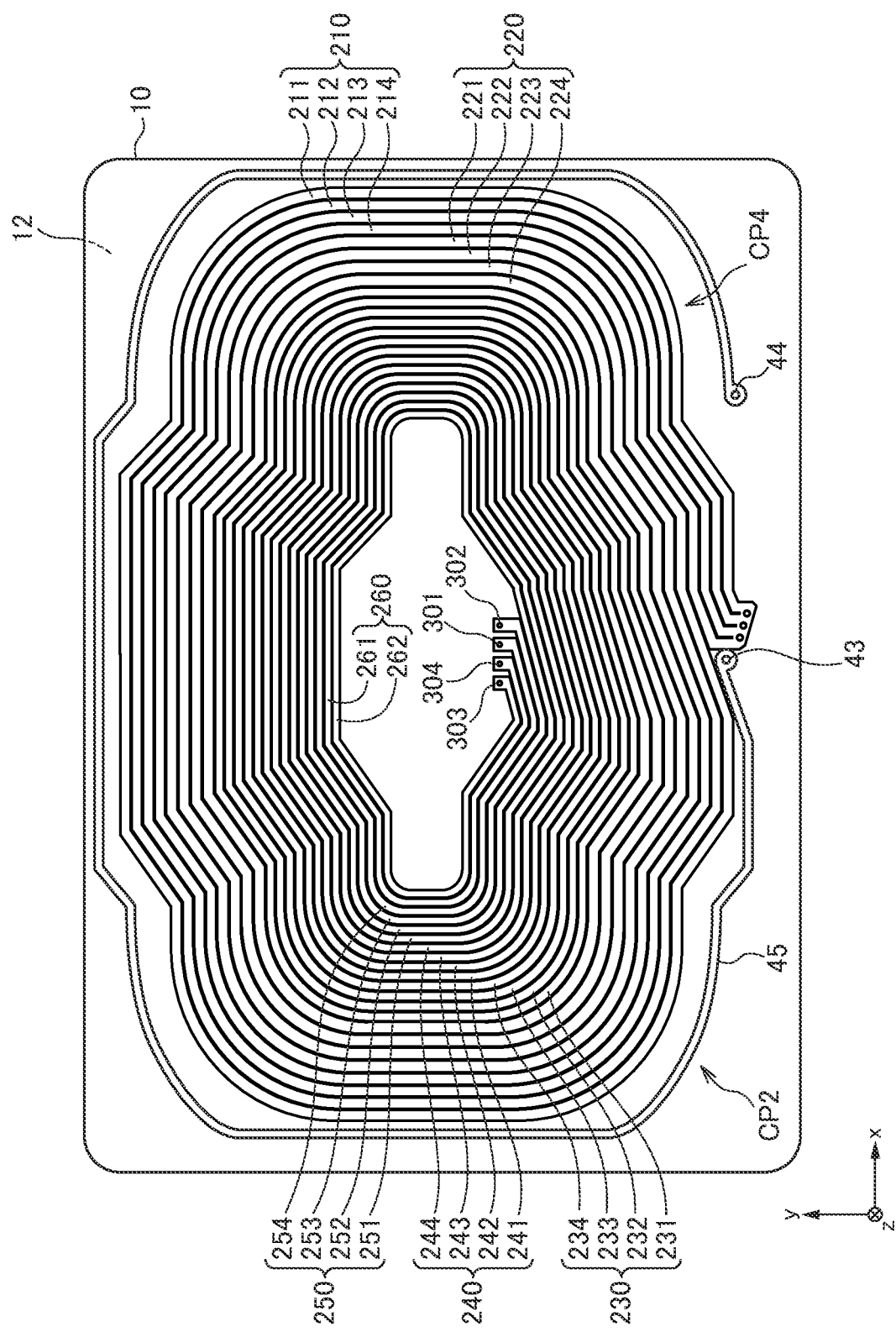
FIG. 3 is a schematic transparent plan view illustrating the shape of a conductor pattern formed on the surface 12 of the substrate 10 as viewed from the surface 11 side of the substrate 10.

FIG. 3 is a schematic transparent plan view illustrating the shape of a conductor pattern formed on the surface 12 of the substrate 10 as viewed from the surface 11 side of the substrate 10.

As illustrated in FIG. 3, there are formed, on the surface 12 of the substrate 10, the second coil pattern CP2 and fourth coil pattern CP4.

The fourth coil pattern CP4 has the same pattern shape as the third coil pattern CP3. The fourth coil pattern CP4 has a six-turn configuration constituted of turns 210, 220, 230, 240, 250, and 260, and the turns 210 and 260 are positioned at the outer and inner peripheries, respectively. The turns 210, 220, 230, 240, and 250 are each radially divided into four by three spiral slits. The turn 260 is radially divided into two by a single spiral slit. Thus, the turn 210 is divided into four lines 211 to 214, the turn 220 is divided into four lines 221 to 224, the turn 230 is divided into four lines 231 to 234, the turn 240 is divided into four lines 241 to 244, the turn 250 is divided into four lines 251 to 254, and the turn 260 is divided into two lines 261 and 262.

The lines 211, 221, 231, 241, 251, and 261 are continuous lines spirally wound in six turns and are each positioned at the outermost periphery in its corresponding turn. The lines 212, 222, 232, 242, 252, and 262 are continuous lines spirally wound in six turns and are each the second line counted from the outermost peripheral line in its corresponding turn. The lines 213, 223, 233, 243, and 253 are continuous lines spirally wound in five turns and are each the second line counted from the innermost peripheral line in its corresponding turn. The lines 214, 224, 234, 244, and 254 are continuous lines spirally wound in five turns and are each positioned at the innermost periphery in its corresponding turn.

The outer peripheral ends of the lines 211 to 214 are connected in common to the second terminal electrode E2 via through hole conductors. The inner peripheral ends of the lines 261, 262, 253, and 254 are connected respectively to the through hole conductors 304, 303, 302, and 301. As a result, the power transmission coil C1 having a configuration in which four lines each having 11 turns are connected in parallel is connected between the first and second terminal electrodes E1 and E2.

Like the third coil pattern CP3, the fourth coil pattern CP4 includes a first section S1 extending in the y-direction, a second section S2 extending in the x-direction, and a third section S3 positioned between the first and second sections S1 and S2.

The conductor pattern 45 constituting the second coil pattern CP2 is a continuous line wound in about one turn and disposed outside the fourth coil pattern CP4 so as to surround the fourth coil pattern CP4. That is, the fourth coil pattern CP4 is disposed in the opening area (inner diameter area) of the conductor pattern 45 constituting the second coil pattern CP2. One end and the other end of the conductor pattern 45 are connected respectively to the through hole conductors 43 and 44. As a result, the antenna coil C2 constituted of the first and second coil patterns CP1 and CP2 has about two turns in total.

Like the first coil pattern CP1, the second coil pattern CP2 includes a fourth section S4 extending in the y-direction, a fifth section S5 extending in the x-direction, and a sixth section S6 positioned between the fourth and fifth sections S4 and S5.

Figure 4:
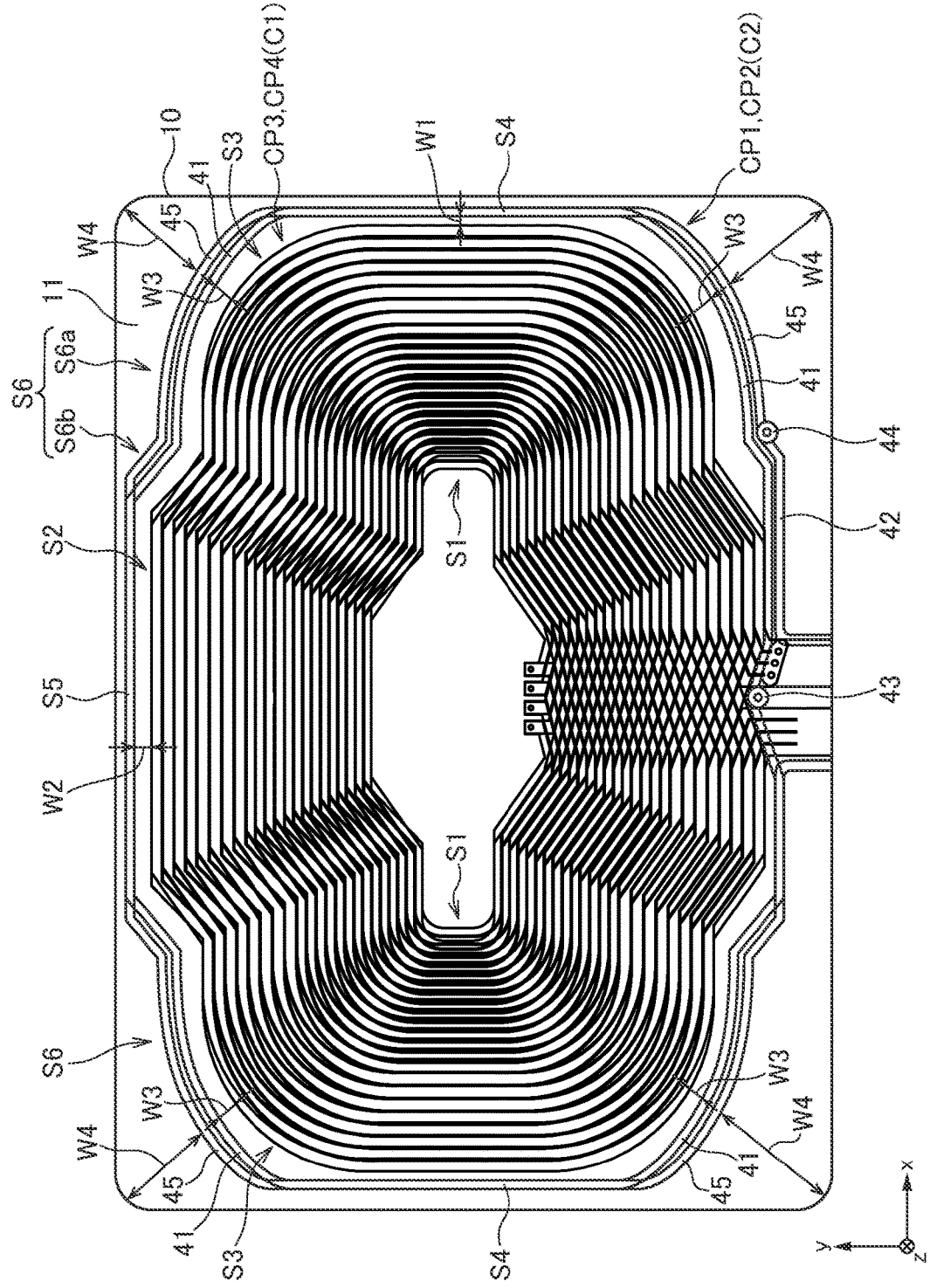
FIG. 4 is a schematic plan view illustrating a state where the first and third coil patterns CP1 and CP3 and the second and fourth coil patterns CP2 and CP4 are made to overlap as viewed from the surface 11 of the substrate 10.

FIG. 4 is a schematic plan view illustrating a state where the first and third coil patterns CP1 and CP3 and the second and fourth coil patterns CP2 and CP4 are made to overlap as viewed from the surface 11 of the substrate 10.

As illustrated in FIG. 4, for the first and second coil patterns CP1 and CP2 constituting the antenna coil C2, the fourth sections S4 overlap each other in the z-direction, and the fifth sections S5 overlap each other in the z-direction, whereas the sixth sections S6 do not overlap each other in the z-direction. Although not particularly limited, in each of the sixth sections S6, the conductor pattern 45 constituting the second coil pattern CP2 is positioned on the outer peripheral side of the conductor pattern 41 constituting the first coil pattern CP1. By employing the configuration in which the first and second coil patterns CP1 and CP2 partly overlap each other, it is possible to reduce the size of the antenna coil C2 while reducing a stray capacitance generated between the first and second coil patterns CP1 and CP2. In particular, the linearly extending sections S4 and S5 overlap those of the counterpart coil pattern, thus facilitating the pattern design.

The sixth sections S6 each have a curved part S6*a* and a transition part S6*b*. The curved part S6*a* is positioned close to the fourth section S4 and whose extending direction gradually changes from the y-direction to the x-direction as it goes from the fourth section S4 toward the fifth section S5. The transition part Sb6 is positioned close to the fifth section S5 and shifts outward the y-direction position of the fifth section S5 in the in-plane direction of the substrate 10. As a result, the opening area of the antenna coil C2 is increased in width in the y-direction at the center portion thereof in the x-direction, so that even when the position of the antenna coil C2 and position of an antenna coil as a communication target are relatively displaced from each other in the y-direction, communication can be performed properly.

Further, assuming that a first width of a gap between the first section S1 of the power transmission coil C1 and the fourth section S4 of the antenna coil C2 is W1, a second width of a gap between the second section S2 of the power transmission coil C1 and the fifth section S5 of the antenna coil C2 is W2, and a third width of a gap between the third section S3 of the power transmission coil C1 and the sixth section S6 of the antenna coil C2 is W3, W1<W2<W3 is satisfied. That is, the second width W2 is larger than the width W1 and smaller than the third width W3. This ensures a sufficient width in the x-direction of the power transmission coil C1, so that even when the position of the power transmission coil C1 and the position of a power receiving coil are relatively displaced from each other in the x-direction, power feeding can be performed properly. Further, since the second and third widths W2 and W3 are larger than the first width W1, coupling between the power transmission coil C1 and the antenna coil C2 is reduced at the gaps having the second and third widths W2 and W3, with the result that satisfactory communication characteristics can be obtained. In particular, the third width W3 is larger than the second width W2, making it easy for the magnetic flux generated from the antenna coil C2 to pass through the gap with the third width W3, which further improves communication characteristics. The gap between the power transmission coil C1 and the antenna coil C2 has the third width W3 not only in the 1 o'clock direction, 2 o'clock direction, 10 o'clock direction, and 11 o'clock direction, but also in the 4 o'clock direction, 5 o'clock direction, 7 o'clock direction, and 8 o'clock direction. That is, a part of the antenna coil C2 positioned at the 4 o'clock direction position, 5 o'clock direction position, 7 o'clock direction position, and 8 o'clock direction position has the same pattern shape as the sixth section positioned at the 1 o'clock direction position, 2 o'clock direction position, 10 o'clock direction position, and 11 o'clock direction position and has the above-mentioned curved part S6a and transition part S6b. In the present embodiment, the power transmission coil C1 and antenna coil C2 each have a width larger in the x-direction than in the y-direction.

Assuming that the distance between the sixth section S6 of the antenna coil C2 and a corner part of the magnetic sheet 30 as viewed in the z-direction is W4, W3<W4 is satisfied. That is, the distance between the sixth section S6 of the antenna coil C2 and the corner part of the magnetic sheet 30 as viewed in the z-direction is larger than the distance between the third section S3 of the power transmission coil C1 and the sixth section S6 of the antenna coil C2 as viewed in the z-direction. Thus, the area of the magnetic sheet 30 positioned outside the antenna coil C2 as viewed in the z-direction is sufficiently ensured, so that even when a metal member exists at the back of the magnetic sheet 30, the influence of a demagnetizing field generated from the metal member is reduced.

Further, as illustrated in FIG. 1, assuming that the distance between the antenna coil C2 and the magnetic sheet 30 in the z-direction is W0, W0<W4 is satisfied. That is, the distance between the antenna coil C2 and the end edge of the magnetic sheet 30 in the in-plane direction of the substrate 10 is larger than the distance between the antenna coil C2 and the magnetic sheet 30 in the z-direction. The distance between the antenna coil C2 and the magnetic sheet 30 in the z-direction is thus small, so that even when a metal member exists at the back of the magnetic sheet 30, the influence of a demagnetizing field generated from the metal member is reduced.

Further, a part of the conductor pattern 41 constituting the first coil pattern CP1 that is positioned in the vicinity of the through hole conductor 43 overlaps the fourth coil pattern CP4 in the z-direction so as to cross the vicinity of the outer peripheral end of the fourth coil pattern CP4, i.e., to cross between the outer peripheral end of the fourth coil pattern CP4 and the outermost turn thereof. Similarly, a part of the conductor pattern 45 constituting the second coil pattern CP2 that is positioned in the vicinity of the through hole conductor 43 overlaps the third coil pattern CP3 in the z-direction so as to cross the vicinity of the outer peripheral end of the third coil pattern CP3, i.e., to cross between the outer peripheral end of the third coil pattern CP3 and the outermost turn thereof. This minimizes overlap between the power transmission coil C1 and the antenna coil C2, making it possible to prevent deterioration in communication characteristics ascribable to a stray capacitance therebetween.

Figure 5:
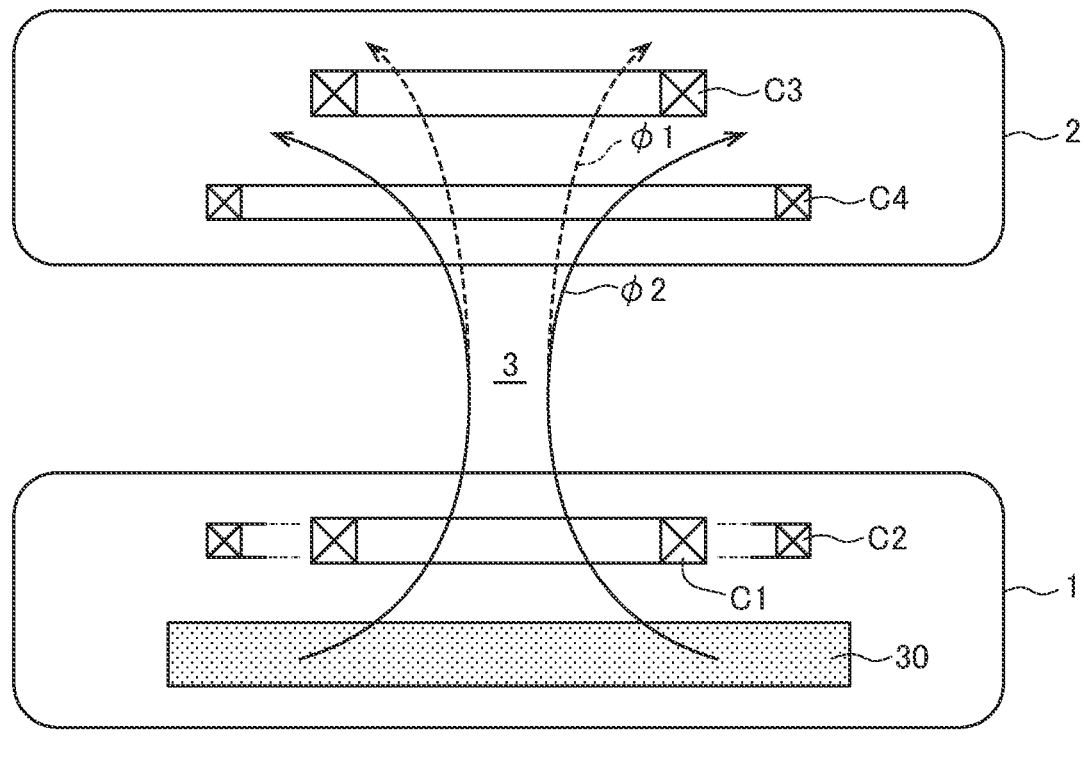
FIG. 5 is a schematic view for explaining the function of the coil component 1.

FIG. 5 is a schematic view for explaining the function of the coil component 1.

As illustrated in FIG. 5, when the coil component 1 according to the present embodiment and a counterpart device 2 as a communication target are made to face each other through a space 3, magnetic flux φ1 generated from the power transmission coil C1 interlinks a power receiving coil C3 included in the counterpart device 2, thereby achieving wireless power transmission. Further, magnetic flux φ2 generated from the antenna coil C2 interlinks an antenna coil C4 included in the counterpart device 2, thereby achieving NFC-based wireless communication.

As described above, in the coil component 1 according to the present embodiment, the conductor patterns formed on the surfaces of the substrate 10 constitute both the power transmission coil C1 for wireless power transmission and the antenna coil C2 for NFC, allowing a reduction in the number of components.

Figure 6:
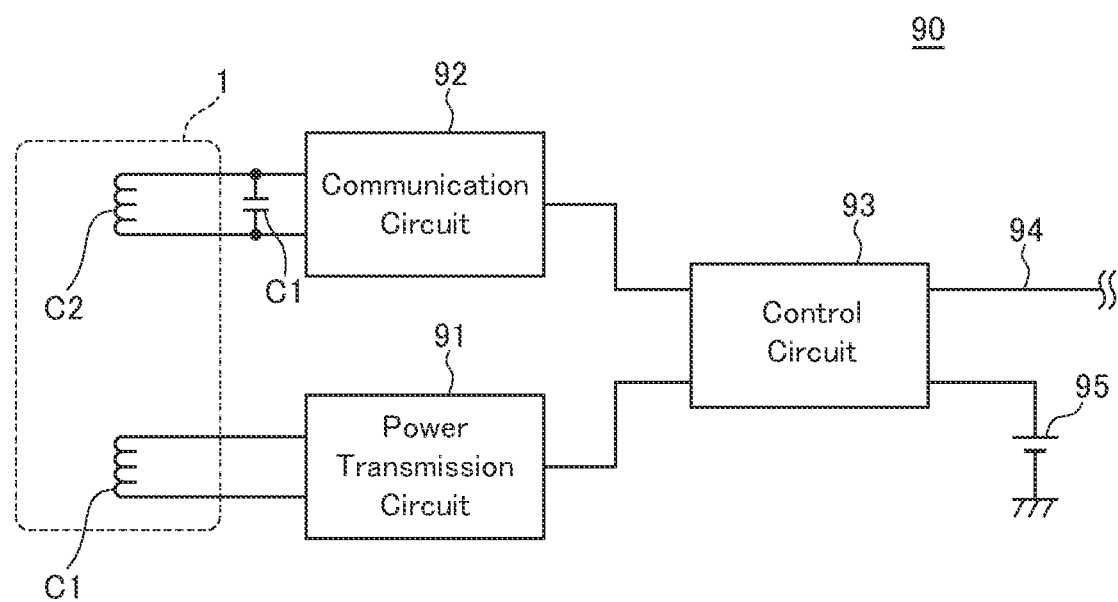
FIG. 6 is a block diagram of a wireless power transmission device 90 using the coil component 1.

FIG. 6 is a block diagram of a wireless power transmission device 90 using the coil component 1 according to the present embodiment.

The wireless power transmission device 90 illustrated in FIG. 6 includes the coil component 1 having the power transmission coil C1 and antenna coil C2, a power transmission circuit 91 connected to the power transmission coil C1, and a communication circuit 92 connected to the antenna coil C2. The power transmission circuit 91 and communication circuit 92 are connected to a control circuit 93. Thus, the data to be transmitted/received through a communication line 94 can communicate through the antenna coil C2 for NFC, and power supplied from a power supply 95 can be transmitted wirelessly through the power transmission coil C1 for wireless power transmission.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples, but not limited thereto.

A coil component according to the present disclosure includes a first coil and a second coil disposed so as to surround the first coil. The first coil includes a first section extending in a first direction, a second section extending in a second direction orthogonal to the first direction, and a third section positioned between the first and second sections. Gaps between the first, second, and third sections of the first coil and the second coil as viewed in the coil axis direction have a first width, a second width, and a third width, respectively, wherein the second width is larger than the first width and smaller than the third width. With this configuration, it is possible to satisfy both the power transmission characteristics and the communication characteristics by using the first and second coils as a power transmission coil and an antenna coil, respectively.

The coil component according to the present disclosure may further include a substrate on which the first and second coils are formed, wherein the second coil may include a first coil pattern provided on one surface of the substrate and a second coil pattern provided on the other surface of the substrate, and the first and second coil patterns have a section overlapping each other in the coil axis direction and another section not overlapping each other in the coil axis direction. This reduces the size of the second coil while reducing a stray capacitance generated between the first and second coil patterns.

Each of the first and second coil patterns may include a fourth section extending in the first direction, a fifth section extending in the second direction, and a sixth section positioned between the fourth and fifth sections, wherein the fourth section of the first coil pattern may overlap the fourth section of the second coil pattern, the fifth section of the first coil pattern may overlap the fifth section of the second coil pattern, and the sixth section of the first coil pattern need not overlap the sixth section of the second coil pattern. This can further reduce the size of the second coil.

The sixth section of each of the first and second coil patterns may include: a curved part which is positioned close to the fourth section and whose extending direction gradually changes from the first direction to second direction as it goes from the fourth section toward the fifth section; and a transition part which is positioned close to the fifth section and which shifts outward the first direction position of the fifth section in the in-plane direction of the substrate. Thus, using the second coil as an antenna coil allows proper communication to be performed even when the position of the second coil and the position of an antenna coil as a communication target are relatively displaced from each other in the first direction.

The coil component according to the present disclosure may include a magnetic sheet overlapping the first and second coils in the coil axis direction, wherein the distance between the sixth section of the second coil and a corner part of the magnetic sheet as viewed in the coil axis direction may be larger than the distance between the third section of the first coil and the sixth section of the second coil as viewed in the coil axis direction. Thus, even when a metal member exists at the back of the magnetic sheet, the influence of a demagnetizing field generated from the metal member is reduced.

Further, the distance between the second coil and the end edge of the magnetic sheet in the in-plane direction of the substrate may be larger than the distance between the second coil and the magnetic sheet in the coil axis direction. Thus, even when a metal member exists at the back of the magnetic sheet, the influence of a demagnetizing field generated from the metal member is reduced.

Further, the first coil may include a third coil pattern provided on the one surface of the substrate and a fourth coil pattern provided on the other surface of the substrate, wherein the inner peripheral end of the third coil pattern may be connected to the inner peripheral end of the fourth coil pattern through a through hole conductor penetrating the substrate, the outer peripheral end of the third coil pattern may be connected to a first terminal electrode, the outer peripheral end of the fourth coil pattern may be connected to a second terminal electrode, a part of the first coil pattern may overlap the fourth coil pattern in the coil axis direction so as to cross between the outer peripheral end of the fourth coil pattern and the outermost turn of the fourth coil pattern, and a part of the second coil pattern may overlap the third coil pattern in the coil axis direction so as to cross between the outer peripheral end of the third coil pattern and the outermost turn of the third coil pattern. Thus, using the second coil as an antenna coil can prevent deterioration in communication characteristics ascribable to a stray capacitance between the first and second coils.

Further, one end of the second coil is connected to a third terminal electrode, the other end of the second coil is connected to a fourth terminal electrode, and the first and second terminal electrodes may be disposed so as to be sandwiched between the third and fourth terminal electrodes. This reduces the influence of noise from the first coil and facilitates connection to a device in which the coil component is to be incorporated.

Further, a wireless power transmission device according to the present disclosure includes: the above-described coil component; a power transmission circuit connected to the first coil; and a communication circuit connected to the second coil. With this configuration, wireless power transmission and NFC-based communication can be achieved.

What is claimed is:

1. A coil component comprising:
   a first coil;
   a second coil disposed so as to surround the first coil; and
   a substrate on which the first coil and the second coil are formed,
   wherein the first coil includes a first section extending in a first direction, a second section extending in a second direction orthogonal to the first direction, and a third section positioned between the first and second sections,
   wherein gaps between the first, second, and third sections of the first coil and the second coil as viewed in a coil axis direction have a first width, a second width, and a third width, respectively,
   wherein the second width is larger than the first width and smaller than the third width,
   wherein the second coil includes a first coil pattern provided on one surface of the substrate and a second coil pattern provided on other surface of the substrate, and
   wherein the first coil pattern and the second coil pattern have a section overlapping each other in the coil axis direction and another section not overlapping each other in the coil axis direction.

2. The coil component as claimed in claim 1,
   wherein each of the first and second coil patterns includes a fourth section extending in the first direction, a fifth section extending in the second direction, and a sixth section positioned between the fourth and fifth sections, wherein the fourth section of the first coil pattern overlaps the fourth section of the second coil pattern, wherein the fifth section of the first coil pattern overlaps the fifth section of the second coil pattern, and wherein the sixth section of the first coil pattern does not overlap the sixth section of the second coil pattern.

3. The coil component as claimed in claim 2, wherein the sixth section of each of the first and second coil patterns includes:
- a curved part which is positioned close to the fourth section and whose extending direction gradually changes from the first direction to second direction as it goes from the fourth section toward the fifth section; and
- a transition part which is positioned close to the fifth section and which shifts outward the first direction position of the fifth section in an in-plane direction of the substrate.

4. The coil component as claimed in claim 2, further comprising a magnetic sheet overlapping the first and second coils in the coil axis direction, wherein a distance between the sixth section of the second coil and a corner part of the magnetic sheet as viewed in the coil axis direction is larger than a distance between the third section of the first coil and the sixth section of the second coil as viewed in the coil axis direction.

5. The coil component as claimed in claim 4, wherein a distance between the second coil and an end edge of the magnetic sheet in an in-plane direction of the substrate is larger than a distance between the second coil and the magnetic sheet in the coil axis direction.

6. The coil component as claimed in claim 1, wherein the first coil includes a third coil pattern provided on the one surface of the substrate and a fourth coil pattern provided on the other surface of the substrate, wherein an inner peripheral end of the third coil pattern is connected to an inner peripheral end of the fourth coil pattern through a through hole conductor penetrating the substrate, wherein an outer peripheral end of the third coil pattern is connected to a first terminal electrode, wherein an outer peripheral end of the fourth coil pattern is connected to a second terminal electrode, wherein a part of the first coil pattern overlaps the fourth coil pattern in the coil axis direction so as to cross between the outer peripheral end of the fourth coil pattern and an outermost turn of the fourth coil pattern, and wherein a part of the second coil pattern overlaps the third coil pattern in the coil axis direction so as to cross between an outer peripheral end of the third coil pattern and an outermost turn of the third coil pattern.

7. The coil component as claimed in claim 6, wherein one end of the second coil is connected to a third terminal electrode, wherein other end of the second coil is connected to a fourth terminal electrode, and wherein the first and second terminal electrodes are disposed so as to be sandwiched between the third and fourth terminal electrodes.

8. A wireless power transmission device comprising:
a coil component comprising i) a first coil, ii) a second coil disposed so as to surround the first coil, and iii) a substrate on which the first coil and the second coil are formed;
a power transmission circuit connected to the first coil; and
a communication circuit connected to the second coil,
wherein the first coil includes a first section extending in a first direction, a second section extending in a second direction orthogonal to the first direction, and a third section positioned between the first and second sections,
wherein gaps between the first, second, and third sections of the first coil and the second coil as viewed in a coil axis direction have a first width, a second width, and a third width, respectively,
wherein the second width is larger than the first width and smaller than the third width,
wherein the second coil includes a first coil pattern provided on one surface of the substrate and a second coil pattern provided on other surface of the substrate, and
wherein the first coil pattern and the second coil pattern have a section overlapping each other in the coil axis direction and another section not overlapping each other in the coil axis direction.

* * * * *